(12) United States Patent
Nakatsu

(10) Patent No.: US 7,227,157 B2
(45) Date of Patent: Jun. 5, 2007

(54) STIMULABLE CERIUM ACTIVATED LUTETIUM BORATE PHOSPHOR

(75) Inventor: Masaharu Nakatsu, Kanagawa (JP)

(73) Assignee: Fujifilm Corporation, Tokyo (JP)

(*) Notice: Subject to any disclaimer, the term of this patent is extended or adjusted under 35 U.S.C. 154(b) by 256 days.

(21) Appl. No.: 11/103,466

(22) Filed: Apr. 12, 2005

(65) Prior Publication Data

US 2005/0236582 A1    Oct. 27, 2005

(30) Foreign Application Priority Data

Apr. 12, 2004    (JP)    ............... 2004-117159

(51) Int. Cl.
G03B 42/02    (2006.01)
G21K 1/00    (2006.01)

(52) U.S. Cl. ............... 250/484.4; 252/301.4 R; 428/690

(58) Field of Classification Search ............ 250/484.4, 250/580, 581, 582
See application file for complete search history.

(56) References Cited

U.S. PATENT DOCUMENTS 4,841,530 A * 6/1989 Chai et al. ............... 372/41
4,883,970 A * 11/1989 Page ................... 250/483.1

FOREIGN PATENT DOCUMENTS

WO    WO 200129147 A1 *    4/2001

* cited by examiner

*Primary Examiner*—Albert J. Gagliardi
*Assistant Examiner*—Casey Bryant
(74) *Attorney, Agent, or Firm*—Sughrue Mion, PLLC

(57) ABSTRACT

A cerium activated lutetium borate phosphor of the following formula (I):

$$(Lu_x, Ln_y)BO_3 : aCe, bA \qquad (I)$$

in which Ln is at least one rare earth element selected from the group consisting of Y, La and Gd; A is at least one element selected from the group consisting of Pr, Nd, Pm, Sm, Eu, Tb, Dy, Ho, Er, Tm, Yb and Zr; and x, y, a and b are numbers satisfying the conditions of $0.5 \leq x < 1$, $0 \leq y < 0.5$, $0 < a \leq 0.2$, $0 \leq b \leq 0.2$ and $x+y+a+b=1.0$, gives a stimulated emission off when it is excited with an electromagnetic wave after exposing to a radiation such as X-rays.

10 Claims, 3 Drawing Sheets

STIMULABLE CERIUM ACTIVATED LUTETIUM BORATE PHOSPHOR

FIELD OF THE INVENTION

The present invention relates to a stimulable cerium activated lutetium borate phosphor capable of giving a stimulated emission off, a radiation image storage panel comprising that phosphor, and a radiation image recording and reproducing method.

BACKGROUND OF THE INVENTION

When exposed to a radiation such as X-rays, an energy-storing phosphor (e.g., stimulable phosphor, which gives off stimulated emission) absorbs and stores a portion of the radiation energy. The phosphor then emits a stimulated emission according to the level of the stored energy when exposed to electromagnetic wave such as visible or infrared light (i.e., stimulating light). A radiation image recording and reproducing method utilizing the energy-storing phosphor has been widely employed in practice. In the method, a radiation image storage panel which is a sheet comprising the energy-storing phosphor is used. The method comprises the steps of: exposing the storage panel to a radiation having passed through an object or having radiated from an object, so that a radiation image information of the object is temporarily recorded in the storage panel; sequentially scanning the storage panel with a stimulating light such as a laser beam to emit a stimulated light; and photoelectrically detecting the emitted light to obtain electric image signals. The storage panel thus processed is subjected to a step for erasing radiation energy remaining therein, and then stored for the use in the next recording and reproducing procedure. Thus, the radiation image storage panel can be repeatedly used.

The radiation image storage panel (often referred to as energy-storing phosphor sheet) has a basic structure comprising a support and an energy-storing phosphor layer provided thereon. However, if the phosphor layer is self-supporting, the support may be omitted. Further, a protective layer is generally provided on the free surface (surface not facing the support) of the phosphor layer to keep the phosphor layer from chemical deterioration or physical damage.

Various kinds of energy-storing phosphor layer are known and used. For example, a phosphor layer comprising a binder and an energy-storing phosphor dispersed therein is used, and a phosphor layer comprising agglomerate of an energy-storing phosphor without binder is also known. The latter can be formed by a gas phase-accumulation method or by a firing method.

The radiation image recording and reproducing method (or radiation image forming method) has various advantages as described above. However, it is still desired that the radiation image storage panel used in the method have as high sensitivity as possible and give a reproduced radiation image of high quality (in regard to sharpness and graininess).

It is known that rare earth activated rare earth borate compounds give instant emission off in the ultraviolet or visible wavelength region. For example, L. Zhang et al., "Radiation Effects & Defects in Solids", vol. 150, pp. 47 to 52 describes that a cerium or praseodymium activated lutetium orthoborate ($LuBO_3:Ce^{3+}$, $LuBO_3:Pr^{3+}$) shows scintillation, namely, gives off instant emission in the ultraviolet or visible wavelength region when excited with UV light or X-rays.

Japanese Patent Provisional Publication Nos. 11-271453, 2001-187884 and 2003-248282 propose utilization of rare earth activated rare earth borates (e.g., $GdBO_3:Eu$, $YBO_3:Eu$) as scintillators or as phosphors for lamps or plasma display panels.

For preparing the rare earth activated rare earth borate, a hydrothermal process is known. For example, Japanese Patent Provisional Publication No. 2001-187884 discloses a process comprising the steps of: preparing an aqueous solution of $Y_2(OH)_3$, $EU_2(OH)_3$ and $H_2BO_3$, adding a basic aqueous solution (e.g., aqueous ammonia) to the former aqueous solution to prepare hydrates; and causing hydrothermal reaction of the hydrates at a predetermined temperature and a predetermined pressure. In the process, it is necessary to make the hydrates gel in the hydration step.

Xiao-Cheng Jiang et al., "Journal of Solid State Chemistry", vol. 175 (2003), pp. 245 to 251 describes another process which comprises the steps of: dissolving $Y_2O_3$, $Eu_2O_3$ and $H_2BO_3$ in nitric acid, adjusting the pH value of the solution, adding urea to the solution, and subjecting the solution to hydrothermal processing. In the process, an excess of urea often forms undesirable compounds such as $Y(OH)CO_3$ and $Eu(OH)CO_3$. Further, products given by the process are in the form of polydispersive particles.

Yuhua Wang et al., "Chemistry Letters", vol. 30 (2001), No. 3, pp. 206 to 207 describes a process which comprises the steps of: dissolving $Gd_2O_3$, $Eu_2O_3$ and $B_2O_3$ in nitric acid, evaporating the solution to dryness, and treating the residue hydrothermally.

SUMMARY OF THE INVENTION

It is an object of the present invention to provide a new stimulable phosphor suitable for the radiation image forming method utilizing the energy-storing phosphor.

It is another object of the invention to provide a radiation image storage panel comprising the stimulable phosphor.

It is still another object of the invention to provide a radiation image recording and reproducing method utilizing the radiation image storage panel comprising the stimulable phosphor.

The applicant has studied energy-storing phosphors usable for the radiation image forming method, and found that a cerium activated lutetium borate having been exposed to X-rays or UV rays gives visible stimulated emission off when it is excited with a visible light.

The present invention resides in a radiation image storage panel having a phosphor layer which comprises a stimulable cerium activated lutetium borate phosphor represented by the following formula (I):

$$(Lu_x,Ln_y)BO_3:aCe,bA \quad (I)$$

in which Ln is at least one rare earth element selected from the group consisting of Y, La and Gd; A is at least one element selected from the group consisting of Pr, Nd, Pm, Sm, Eu, Tb, Dy, Ho, Er, Tm, Yb and Zr; and x, y, a and b are numbers satisfying the conditions of $0.5 \leq x < 1$, $0 \leq y < 0.5$, $0 < a \leq 0.2$, $0 \leq b \leq 0.2$ and $x+y+a+b=1.0$.

The invention also resides in a method for producing a stimulated emission which comprises the steps of:

applying a radiation to a stimulable cerium activated lutetium borate phosphor of the formula (I), whereby storing an energy of the radiation in the phosphor and stimulating the phosphor in which the energy of the radiation is stored with a stimulating light, whereby giving a stimulated emission off.

The invention further resides in a radiation image recording and reproducing method comprising the steps of:

exposing the radiation image storage panel of the invention to a radiation having passed through an object or having radiated from an object, whereby a spatial energy distribution of the radiation is recorded as a latent image in the phosphor layer of the storage panel;

irradiating the storage panel with a stimulating light to emit a stimulated light from the latent image in the phosphor layer;

photoelectrically detecting and converting the stimulated light to image signals; and forming a radiation image from the image signals.

The cerium activated lutetium borate phosphor of the invention is a novel stimulable phosphor, and is favorably employable for the radiation image forming method. The radiation image storage panel of the invention, which comprises the phosphor of the invention, and the radiation image recording and reproducing method of the invention can be favorably used for medical radiation image diagnosis.

DETAILED DESCRIPTION OF THE INVENTION

Figure 1:
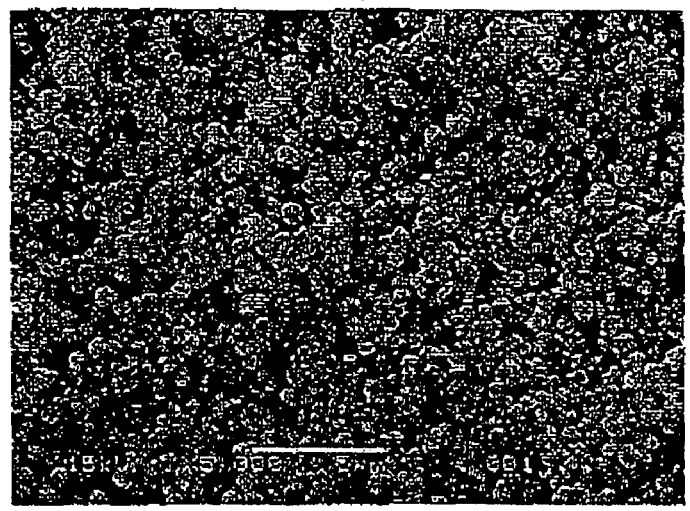
FIG. 1 is a scanning electron micrograph (×5.000) of stimulable $Lu_{0.99875}BO_3$:0.001Ce, 0.00025Sm phosphor of the invention.

In the above formula (I), A is preferably Sm and/or Zr. The number represented by b preferably is 0. The number represented by y preferably is 0.

The radiation image storage panel of the invention preferably comprises a support, an energy-storing phosphor layer and a protective layer in order.

The stimulable cerium activated lutetium borate phosphor of the invention used for a radiation image forming method is described below in detail.

The stimulable cerium activated lutetium borate phosphor of the invention can be preferably prepared by the following first method, in which acetates are used as the starting materials, or otherwise by the second method described later, in which an amide compound is incorporated in a solution of material mixture to coexist with the materials.

(1) First Method for Preparation

[Step of Preparing Starting Solution]

As the starting materials, lutetium acetate $[Lu(CH_3COO)_3 \cdot 4H_2O]$, cerium acetate $[Ce(CH_3COO)_3 \cdot H_2O]$, a boron compound, and if desired, a rare earth acetate $[Ln(CH_3COO)_3 \cdot mH_2O$ in which Ln is Y, La and/or Gd, and m is a number of 0 to 4] and other acetates $[A(CH_3COO)_p \cdot nH_2O$ in which A is Pr, Nd, Pm, Sm, Eu, Tb, Dy, Ho, Er, Tm, Yb and/or Zr, p is a number of 2 to 4, and n is a number of 0 to 4] are used. Since the co-activator A is in a small amount, nitrate, oxide or nitrate oxide thereof can be used in place of the acetate. Examples of the boron compounds include boric acid $[H_3BO_3]$, tetraammonium borate $[(NH_4)_2B_4O_7]$ and boron oxide $[B_2O_3]$. Boric acid is preferred.

The starting materials are weighed so that the molar ratio of B/(Lu+Ln+Ce+A) would be in the range of 0.95 to 2.00, preferably 1.00 to 1.50, more preferably 1.02 to 1.25 and so that relative amounts of Lu, Ln, Ce and A would be in the stoichiometrical ratio. The weighed materials are dissolved in an aqueous medium to prepare an aqueous solution. Examples of the aqueous medium include water, deionized water, pure water, and mixtures thereof with a small amount of nonaqueous solvents (e.g., methanol, ethanol).

To the aqueous solution, compounds (e.g., acetates, nitrates) of Na, K, Rb, Cs, Mg, Ca, Sr, Ba, Ti, Zr, Hf, Nb, Ta, Mn, Al, Ga, In, Tl, Si, Ge, Sn and/or Bi can be added in small amounts.

The aqueous solution mixture can have a desired pH value, but it is necessary to adjust the pH value so as not to deposit undesired precipitates such as hydroxides. The pH values at which rare earth elements form the hydroxides to precipitate are different. If even one rare earth element forms the hydroxide in synthesizing the phosphor precursor, a homogeneous rare earth borate cannot be obtained. The pH value of the material solution generally is 9.0 or less, preferably 6.0 or less, more preferably 5.0 or less.

[Step of Hydrothermal Treatment]

The prepared solution is then subjected to a hydrothermal treatment. In the hydrothermal treatment, the solution is processed at a high temperature and a high pressure for a predetermined period of time. Since reactivity, dissociation and precipitation in the solution are enhanced at a high temperature and a high pressure, the desired compound can be easily synthesized and its crystals can be grown well. The treatment comprises the procedures of: placing the solution in a corrosion-resistant and heat-resistant high-pressure reactor such as a stainless steel-made autoclave, and heating the solution in, for example, an electric furnace. The treatment is generally carried out at a temperature of 100° C. to 500° C. If the temperature is below 100° C., the yield of the product is very low. If above 500° C., the size of the reactor is restricted. The treatment temperature preferably is in the range of 120° C. to 300° C., more preferably in the range of 140° C. to 260° C. If the temperature is kept in this range, a fluorocarbon resin made or fluorocarbon resin-coated reactor can be used. The pressure generally is in the range of 0.1 to 50 MPa. The period of time generally is in the range of 0.1 to 100 hours, preferably in the range of 1 to 24 hours.

The reaction mixture produced after the hydrothermal treatment is filtered to collect the precipitated product, which is then washed with alcohol such as ethanol and dried to obtain a powdery cerium activated lutetium borate phosphor (crystalline particles in a single phase).

[Firing Step]

The obtained powdery phosphor can be fired, if desired, to improve the emission properties. The firing step can be performed by the procedures of placing the powdery phosphor in a heat-resistant container such as alumina crucible and then heating the powdery phosphor in an electric furnace. The firing conditions such as temperature, pattern of temperature control, period of time and atmosphere can be optionally chosen. The fired product can be further subjected to various known procedures such as pulverization and sieving, which are generally performed for preparing conventional phosphors.

Thus, the desired stimulable cerium activated lutetium borate phosphor represented by the following formula (I) can be prepared.

$$(Lu_x, Ln_y)BO_3 : aCe, bA \qquad (I)$$

In the formula (I), Ln is at least one rare earth element selected from the group consisting of Y, La and Gd; A is at least one element selected from the group consisting of Pr, Nd, Pm, Sm, Eu, Tb, Dy, Ho, Er, Tm, Yb and Zr; and x, y, a and b are numbers satisfying the conditions of $0.5 \leq x < 1$, $0 \leq y < 0.5$, $0 < a \leq 0.2$, $0 \leq b \leq 0.2$ and $x + y + a + b = 1.0$.

In consideration of stimulated emission properties, the co-activator A in the formula (I) preferably is Sm and/or Zr. Otherwise, the phosphor is preferably activated by Ce only (namely, b is preferably 0). Further, the rare earth element represented by Ln preferably is not contained (namely, y is preferably 0). As additive components or activating components, Na, K, Rb, Cs, Mg, Ca, Sr, Ba, Ti, Hf, Nb, Ta, Mn, Al, Ga, In, Tl, Si, Ge, Sn and/or Bi can be incorporated in an amount of 0.4 mol or less based on one mol of B.

The crystal structure of the obtained powdery stimulable phosphor can be assigned by X-ray diffraction. The shape and size of the phosphor particles can be determined by means of an electron microscope and a diffractive particle size analyzer. The powdery phosphor of the invention generally comprises monodispersive particles since the crystals grow in the hydrothermal treatment. The phosphor particles can be in the form of sphere, tabular, cube or other shapes, but preferably are in the spherical shape. The mean size of the phosphor particles generally is in the range of 0.01 to 30 μm, preferably in the range of 0.1 to 20 μm, more preferably in the range of 0.2 to 10 μm. The powdery phosphor comprising spherical particles of a small mean size can be thus prepared by the hydrothermal treatment.

FIG. 1 is a scanning electron micrograph (×5.000) of powdery $Lu_{0.99875}BO_3 : 0.001Ce, 0.00025Sm$, which is an example of the stimulable phosphor according to the invention. The powdery phosphor consists essentially of monodispersive spherical particles. The powder pattern of X-ray diffraction indicates that the powdery phosphor consists essentially of crystalline particles of vaterite type in a single phase.

Figure 2:
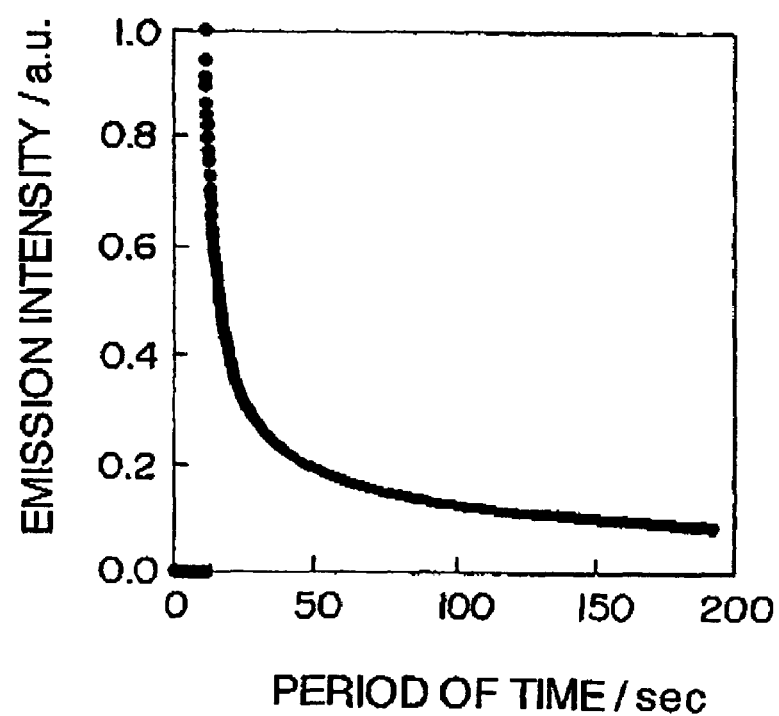
FIG. 2 is a graph showing time-dependence of stimulated emission intensity given off from stimulable $Lu_{0.99875}BO_3$:0.001Ce, 0.00025Sm phosphor of the invention.

FIG. 2 shows time-dependence of stimulated emission intensity (peak wavelength: approx. 400 nm) given off from the powdery phosphor of FIG. 1 when the phosphor having been exposed to X-rays is excited with a semiconductor laser beam (wavelength: 633 nm).

Figure 3:
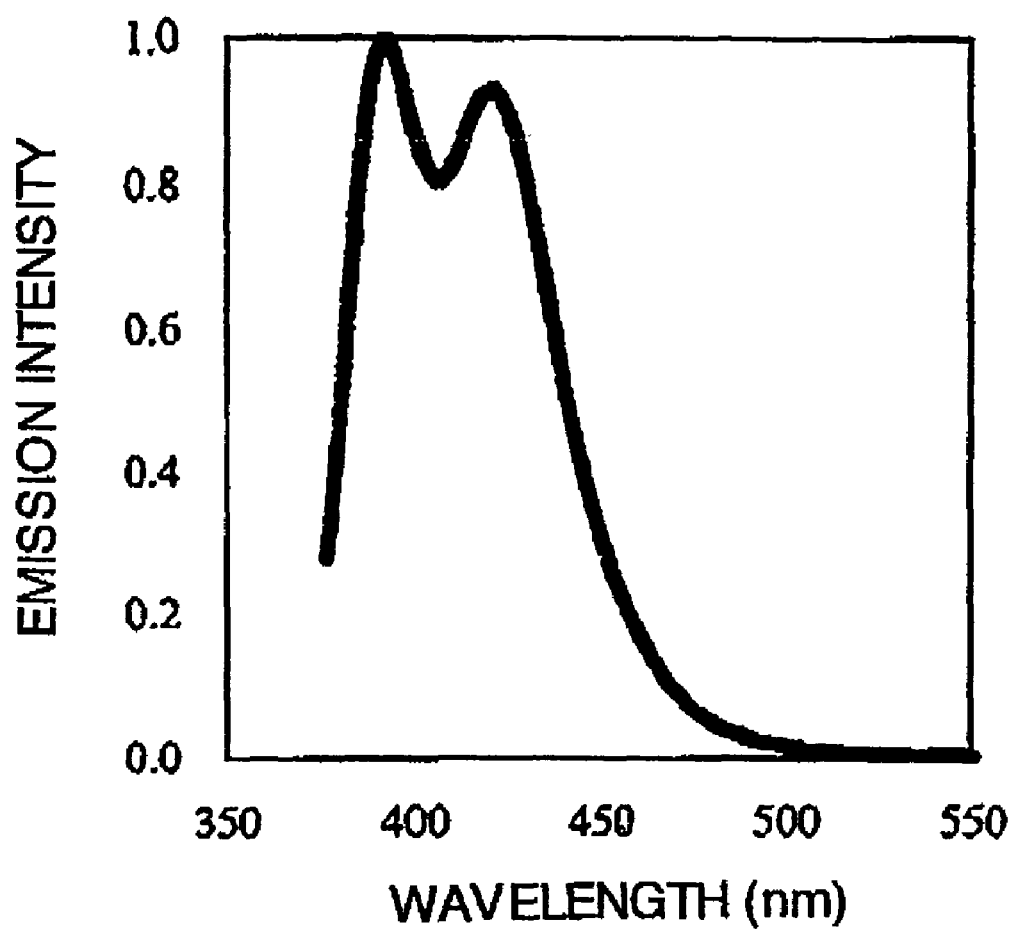
FIG. 3 is a spectrum of stimulated emission given off from stimulable $Lu_{0.99875}BO_3$:0.001Ce, 0.00025Sm phosphor of the invention.

FIG. 3 is a spectrum of stimulated emission given off from the powdery phosphor of FIG. 1.

(2) Second Method for Preparation

[Step of Preparing Starting Solution]

As the starting materials, a lutetium (Lu) compound, a cerium (Ce) compound, a boron (B) compound and an amide compound are used. Further, if desired, other rare earth (Ln, A) compounds and a zirconium (Zr) compound can be used. Examples of the rare earth and zirconium compounds include nitrates, halides (chlorides, bromides, iodides), oxides and hydroxides. Acetates can be used. Examples of the boron (B) compounds are the same as those described above. Examples of the amide compounds include lower amides such as formamide and acetamide.

The starting materials are weighed so that the molar ratio of B/(Lu+Ln+Ce+A) would be in the range of 0.95 to 2.00, preferably 1.00 to 1.50, more preferably 1.02 to 1.25. The weighed materials are dissolved in an aqueous medium to prepare an aqueous solution.

To the aqueous solution of material mixture, compounds (e.g., acetates, nitrates) of Na, K, Rb, Cs, Mg, Ca, Sr, Ba, Ti, Zr, Hf, Nb, Ta, Mn, Al, Ga, In, Tl, Si, Ge, Sn and/or Bi can be added in small amounts.

The aqueous solution can have a desired pH value, but it is necessary to adjust the pH value so as not to deposit undesired precipitates such as hydroxides. The pH value of the starting solution generally is 9.0 or less, preferably 6.0 or less, more preferably 5.0 or less.

If some rare earth compounds are used in the starting materials, the desired reaction product is not always precipitated in the below-described hydrothermal treatment. However, the amide compound coexisting in the starting solution enables the product to precipitate well and increases the yield of the product.

[Step of Hydrothermal Treatment]

As described above, the starting solution containing the amide compound is then subjected to a hydrothermal treatment. The resultant reaction mixture of the hydrothermal treatment is filtered to collect the precipitated product, which is then washed with alcohol such as ethanol and dried to obtain a powdery cerium activated lutetium borate phosphor (crystalline particles in a single phase).

[Firing Step]

The obtained powdery phosphor can be fired, if desired to improve the emission properties. The fired product can be further subjected to various known treatments such as pulverization and sieving.

Thus, the desired stimulable cerium activated lutetium borate phosphor represented by the aforementioned formula (I) can be prepared.

The stimulable phosphor of the invention can be easily prepared by the first or second method, in which it is unnecessary to make the hydrates gel or to evaporate the solution to dryness and in which no by-product is produced. Particularly in the first method, a precursor such as hydrate or carbonate is not produced and hence the phosphor can be easily prepared without any by-product derived from the precursor. The above-mentioned preparation methods, however, by no means restrict the invention, and the stimulable phosphor of the invention can be prepared various known methods.

The radiation image storage panel of the invention is described below.

The radiation image storage panel of the invention comprises an energy-storing phosphor layer containing a stimulable cerium activated lutetium borate phosphor of the formula (I). The phosphor layer generally comprises a binder and the energy-storing phosphor in the form of particles dispersed therein, but further can contain other energy-storing phosphor particles and additives such as colorant. In the following description, the process for preparation of the radiation image storage panel of the invention is explained in detail, by way of example, in the case where the phosphor layer comprises a binder and energy-storing phosphor particles dispersed therein.

The support generally is a soft resin sheet or film having a thickness of 50 μm to 1 mm. Examples of the resin material employable for the support include polyethylene terephthalate, polyethylene naphthalate, aramide resin and polyimide resin. The support can be transparent, can contain a light-reflecting material (e.g., particles of alumina, titanium dioxide and barium sulfate) or voids for reflecting the stimulating light or the emission, or can contain a light-absorbing material (carbon black) for absorbing the stimulating light or the emission. The support can be a sheet of metal, ceramics or glass, if desired.

For improving the sensitivity or the image quality (e.g., sharpness and graininess), a light-reflecting layer containing a light-reflecting material such as titanium dioxide or a light-absorbing layer containing a light-absorbing material such as carbon black can be formed on the support surface on the side where the phosphor layer is provided. On the opposite side of the support surface, a light-shielding layer containing carbon black can be provided. For improving the image quality, fine concaves and convexes may be formed on the phosphor layer-side surface of the support (or on the phosphor layer-side surface of an auxiliary layer such as an undercoating layer (or adhesive layer), a light-reflecting layer or a light-absorbing layer, if they are provided).

On the support (or on the auxiliary layer), the phosphor layer containing the energy-storing phosphor is provided. For forming the phosphor layer, the energy-storing phosphor particles and a binder are dispersed or dissolved in an appropriate organic solvent to prepare a coating solution. The ratio between the binder and the phosphor in the solution generally is in the range of 1:1 to 1:100 (by weight), preferably 1:8 to 1:40 (by weight).

Examples of the binders dispersing and supporting the phosphor particles include natural polymers such as proteins (e.g., gelatin), polysaccharides (e.g., dextran) and gum arabic; and synthetic polymers such as polyvinyl butyral, polyvinyl acetate, nitrocellulose, ethyl cellulose, vinylidene chloride-vinyl chloride copolymer, polyalkyl(meth)acrylate, vinyl chloride-vinyl acetate copolymer, polyurethane, cellulose acetate butyrate, polyvinyl alcohol, linear polyester, and thermoplastic elastomers. These may be crosslinked with a crosslinking agent.

Examples of the solvents employable for the preparation of the coating solution for the phosphor layer include lower aliphatic alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower aliphatic alcohols with lower aliphatic acids such as methyl acetate, ethyl acetate and butyl acetate; ethers such as dioxane, ethylene glycol monoethyl ether, ethylene glycol monomethyl ether and tetrahydrofuran; and mixtures thereof.

The coating solution can contain various additives such as a dispersing aid, a plasticizer for enhancing the bonding between the binder and the phosphor particles, an anti-yellowing agent for preventing the layer from undesirable coloring, a hardening agent, and a crosslinking agent.

The prepared coating solution is then evenly spread to coat a surface of the support by a known means such as a doctor blade, a roll coater or a knife coater, and dried to form the energy-storing phosphor layer. The thickness of the phosphor-layer is determined according to various conditions such as characteristics of the desired storage panel, and the mixing ratio between the binder and the phosphor, but generally is in the range of 20 µm to 1 mm, preferably in the range of 50 to 500 µm.

It is not necessary to form the energy-storing phosphor layer directly on the support. For example, the phosphor layer beforehand formed on another substrate (temporary support) can be peeled off and then fixed onto the support with an adhesive or by pressing with heating.

The energy-storing phosphor layer does not always consist of a single layer, and can consist of two or more sub-layers. In that case, it is possible to change desirably the phosphor, sizes of the phosphor particles and the mixing ratio of binder and phosphor in each sub-layer. The emission properties of the energy-storing phosphor layer can be thus controlled.

On the energy-storing phosphor layer, a protective layer is preferably provided to ensure good handling of the storage panel in transportation and to avoid deterioration. The protective layer is preferably transparent so as not to prevent the stimulating light from coming in or not to prevent the emission from coming out. Further, for protecting the storage panel from chemical deterioration and physical damage, the protective layer preferably is chemically stable, physically strong and of high moisture proof.

The protective layer can be provided by coating the phosphor layer with a solution in which a transparent organic polymer (e.g., cellulose derivatives, polymethyl methacrylate, fluororesins soluble in organic solvents) is dissolved in an appropriate solvent, by placing a beforehand prepared sheet as the protective layer (e.g., a film of glass or organic polymer such as polyethylene terephthalate) on the phosphor layer with an adhesive, or by depositing vapor of inorganic compounds on the phosphor layer. Various additives may be contained in the protective layer. Examples of the additives include light-scattering fine particles (e.g., particles of magnesium oxide, zinc oxide, titanium dioxide and alumina), a slipping agent (e.g., powders of perfluoroolefin resin and silicone resin) and a crosslinking agent (e.g., polyisocyanate). The thickness of the protective layer generally is in the range of about 0.1 to 20 µm if the layer is made of polymer material or in the range of about 100 to 1,000 µm if the layer is made of inorganic material such as glass.

For enhancing the resistance to stain, a fluororesin layer may be further provided on the protective layer. The fluororesin layer can be formed by coating the surface of the protective layer with a solution in which a fluororesin is dissolved (or dispersed) in an organic solvent, and drying the applied solution. The fluororesin may be used singly, but a mixture of the fluororesin and a film-forming resin generally is employed. In the mixture, an oligomer having polysiloxane structure or perfluoroalkyl group can be further added. In the fluororesin layer, fine particle filler may be incorporated to reduce blotches caused by interference and to improve the quality of the resultant radiation image. The thickness of the fluororesin layer is generally in the range of 0.5 to 20 µm. For forming the fluororesin layer, additives such as a crosslinking agent, a film-hardening agent and an anti-yellowing agent can be used. In particular, the crosslinking agent is advantageously employed to improve durability of the fluororesin layer.

Thus, a radiation image storage panel of the invention can be produced. The storage panel of the invention can be in known various structures. For example, in order to improve the sharpness of the resultant image, at least one of the layers or sub-layers may be colored with a colorant which does not absorb the stimulated emission but the stimulating light. Further, another phosphor layer comprising a phosphor which absorbs radiation and spontaneously emits ultraviolet or visible light (namely, a layer of radiation-absorbing phosphor) can be provided. Examples of the phosphors include phosphors of $LnTaO_4$:(Nb, Gd) type, $Ln_2SiO_5$:Ce type and LnOX:Tm type (Ln is a rare earth element); CsX (X: halogen); $Gd_2O_2S$:Tb; $Gd_2O_2S$:Pr,Ce; $ZnWO_4$; $LuAlO_3$:Ce; $Gd_3Ga_5O_{12}$:Cr,Ce; and $HfO_2$.

The radiation image recording and reproducing method of the invention is described below by referring to the attached drawings.

Figure 4:
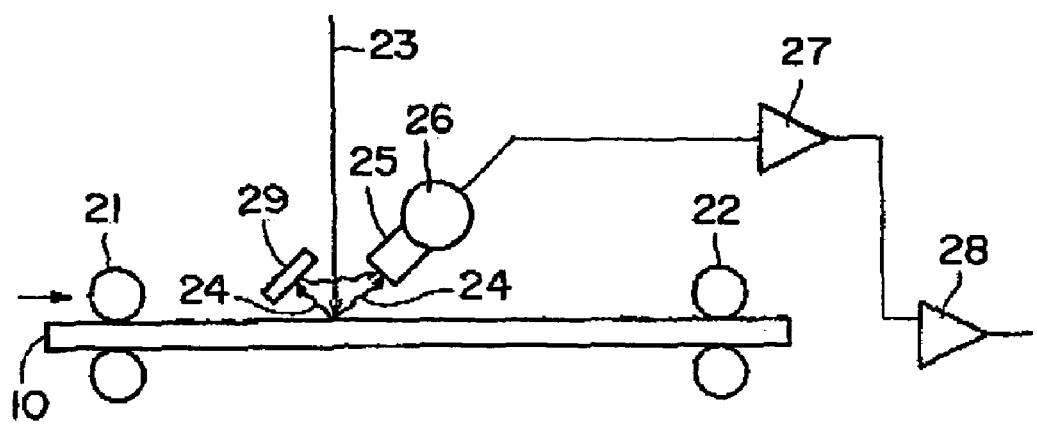
FIG. 4 is a sectional view schematically illustrating an example of the structure of radiation image reading apparatus used in the invention.
Figure 5:
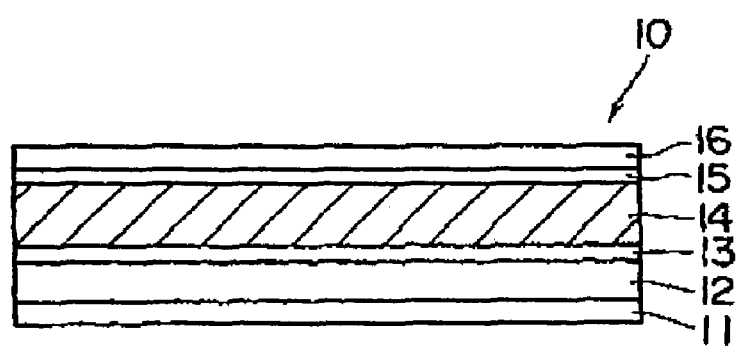
FIG. 5 is a sectional view schematically illustrating an example of the structure of radiation image storage panel according to the invention.

FIG. 4 is a sectional view schematically illustrating an radiation image information-reading apparatus of single-side type adopting a point detection system. FIG. 5 is a sectional view schematically illustrating an example of the radiation image storage panel of the invention. The storage panel 10 comprises a light-shielding layer 11, a support 12, an undercoating layer 13, an energy-storing phosphor layer 14, an adhesive layer 15, and a protective layer 16.

First, radiation image information (information of spatial distribution of radiation energy) is recorded on the radiation image storage panel 10 (recording procedure). This procedure is carried out, for example, by means of a radiation recording apparatus (not shown in the drawings). A sample is placed between the storage panel 10 and a radiation source, and then exposed to a radiation emitted from the source. Examples of the radiations include neutron beams and ionization radiations such as X-ray, γ-ray, α-ray, β-ray, electron beam and ultraviolet light. In accordance with characteristics of the sample and/or the radiation, the radiation passes through the object or is diffracted or scattered by the object. Since the radiation incident to the protective layer 16-side surface of the storage panel 10 is thus affected by the sample, the spatial energy distribution thereof gives image information of the sample. A portion of the irradiated radiation is absorbed and the energy thereof is stored in the phosphor layer 14, and consequently information on the spatial energy distribution is recorded in the energy-storing phosphor layer 14 in the form of a latent image of the sample.

In the case where the sample itself emits radiation (e.g., in the case of autoradiography), the radiation source may be omitted.

Next, the information on the spatial energy distribution recorded in the storage panel 10 is read out by means of the apparatus shown in FIG. 4. The storage panel 10 is installed in the apparatus so that the protective layer 16 would be on the reading side (upside).

In FIG. 4, the storage panel 10 is conveyed with two pairs of nip rollers 21 and 22 in the direction indicated by the arrow. The stimulating light 23 such as a laser beam is applied onto the protective layer-side (phosphor layer-side) surface of the storage panel 10. From the area having been exposed to the stimulating light 23, the phosphor layer gives off stimulated emission 24 according to the level of the stored energy (namely, according to the spatial energy distribution recorded in the form of a latent image of the sample). The stimulated emission 24 is partly reflected by the mirror 29 and collected with the condenser guide 25 placed above. Another portion of the stimulated emission 24 directly comes into the condenser guide 25. Thus condensed emission is converted into electric signals by means of the photo-electric converter (photomultiplier tube) 26 provided on the base of the condenser guide 25. The electric signals are amplified in the amplifier 27, and then transmitted to the signal processor 28.

In the signal processor 28, the signals coming from the amplifier 27 are processed according to the basis of operations (such as addition and subtraction). Thus processed signals are output as image signals.

From the image signals, a visible image is reproduced in an image reproduction apparatus (not shown in the drawings). In this way, the radiation image of the sample is reconstituted on the basis of the spatial energy distribution of radiation. The image reproduction apparatus can be a displaying device such as a CRT display, a light-scanning recorder with photosensitive film, or a thermal recorder with heat-sensitive film. Otherwise, the image signals can be temporarily recorded in an image file stored in an optical disc or a magnetic disc.

Successively after the above reading-out procedure, the storage panel 10 is conveyed with nip rollers 21 and 22 in the direction indicated by the arrow to an area for erasing. In the area for erasing (not shown in the drawings), the storage panel 10 is exposed to erasing light emitted from a light source such as a sodium lamp, a fluorescent lamp or an infrared lamp, or otherwise an electric field generated by; an electric power supply is applied to the panel, and thereby radiation energy remaining in the storage panel is removed so that the remaining latent image may not give undesirable effects to the next recording procedure.

The radiation can be applied to the support-side (light-shielding layer-side) surface of the storage panel. If the storage panel has a structure different from that shown in FIG. 5 (for instance, if the storage panel comprises neither a light-shielding layer nor a light-reflecting layer but comprises a transparent support), the stimulated emission can be collected on the support side or on both sides. For example, another condenser guide 25 and another photo-electric converter 26 are provided below the storage panel 10 in FIG. 4, and the stimulated emission 24 is collected not only on the side having been exposed to the stimulating light 23 but also on the opposite side (double-side reading system).

In the reading-out procedure, a line detection system can be adopted. In that case, the procedure is carried out, for example, in the following manner. While the storage panel or a linear stimulating light source (e.g., LD array, LED array, fluorescent light guide) is being moved parallel to the plane of the panel, a linear stimulating light is applied to the storage panel so that it may cross the moving direction almost perpendicularly. The stimulated emission given off from the latent image area having been exposed to the stimulating light is then sequentially and linearly detected with a line sensor, which is, for example, an array of many solid photo-electric converters. Thus, the information on the spatial distribution of radiation energy can be obtained in the form of electric signals giving a visible radiation image.

The radiation recording apparatus and the radiation image information-reading apparatus described above can be combined to give a single apparatus, whereby the procedures for recording and reading-out can be continuously performed.

EXAMPLE 1

Stimulable $Lu_{0.99875}BO_3$:0.001Ce, 0.00025Sm phosphor

In a polytetrafluoroethylene(PTFE) container, 2.542 g of $Lu(CH_3COO)_3.4H_2O$, 0.0020 g of $Ce(CH_3COO)_3.H_2O$, 0.00060 g of $Sm(CH_3COO)_3.4H_2O$ and 0.408 g of $H_3BO_3$ were mixed and dissolved in water to prepare 30 mL of an aqueous solution (pH: approx. 3.8). There was produced no-precipitate in the aqueous solution. The container filled with the aqueous solution was then placed in a stainless steel autoclave, and the autoclave is closed. The closed autoclave was set in an electric oven equipped with a thermostat, and heated at 200° C. for 10 hours to perform hydrothermal treatment. The reaction liquid was filtered to collect the precipitated product, which was then washed with 200 ml of ethanol and dried at 80° C. to obtain a powder.

The obtained powder was analyzed by means of an X-ray powder diffractometer on the following conditions, and thereby it was confirmed that the powdery product was crystalline $Lu_{0.99875}BO_3$:0.001Ce, 0.00025Sm compound of vaterite type in a single phase.

| X-ray tube: | Cu |
|---|---|
| Tube voltage: | 40 kV |
| Tube current: | 40 mA |
| Sampling width: | 0.020° |
| Scanning speed: | 3.000°/minute |
| Divergence slit: | 1° |
| Scattering slit: | 1° |
| Receiving slit: | 0.3 mm |
| Receiving slit for monochromatic light: | 0.6 mm |

FIG. 1 is a scanning electron micrograph (×5.000) of the prepared $Lu_{0.99875}BO_3$:0.001Ce, 0.00025Sm powder. The phosphor powder consisted essentially of monodispersive spherical particles.

The powder was placed in an alumina crucible, and carbon powder was spread around the crucible. The crucible was then placed in an electric furnace, and fired in the atmospheric conditions at 1,000° C. for 1 hour and then at 1,200° C. for 2 hours.

The fired powder in the amount of 71 mg was evenly packed in a black cylindrical holder (diameter of concave: 10 mm, depth: 250 µm), and exposed to X-rays (40 kV, 30 mA) for 10 seconds in a darkroom. The powder was then exposed to a semiconductor laser beam (wavelength: 633 nm) 12 seconds after the exposure to X-rays. During the exposure of laser beam, stimulated emission (peak wavelength: approx. 400 nm) given off from the powder surface was detected through an optical filter (B-410, from HOYA Corporation) by a photomultiplier tube (R-1849, from HAMAMATSU Photonics K.K.).

FIG. 2 shows how the stimulated emission intensity of the powdery $Lu_{0.99875}BO_3$:0.001Ce, 0.00025Sm varied according to the laser exposing period of time (elapsed time from beginning of the exposure). FIG. 2 clearly indicates that the powder was a stimulable phosphor, which gave off stimulated emission when secondarily excited with a laser beam (633 nm) after primary excitation with X-rays.

EXAMPLE 2

Stimulable $Lu_{0.99725}BO_3$:0.0025Ce, 0.00025Zr phosphor

The procedure of Example 1 was repeated except that 2.538 g of $Lu(CH_3COO)_3 \cdot 4H_2O$, 0.005 g of $Ce(CH_3COO)_3 \cdot H_2O$, 0.0004 g of $ZrO(NO_3)_2 \cdot 2H_2O$ and 0.408 g of $H_3BO_3$ was used as the starting materials, to prepare the stimulable phosphor of the invention represented by the titled formula in the form of powder.

There was no precipitate in the aqueous solution. The solution was then subjected to the hydrothermal treatment, and the obtained powder was analyzed by means of an X-ray diffractometer. It was confirmed that the product was crystalline $Lu_{0.99725}BO_3$:0.0025Ce, 0.00025Zr compound of vaterite type in a single phase. After the product was fired, the stimulated emission properties of the obtained powder was measured. The same graph as FIG. 2 was obtained.

EXAMPLE 3

Stimulable $Lu_{0.995}BO_3$:0.005Ce Phosphor

The procedure of Example 1 was repeated except that 2.585 g of $Lu(NO_3)_3 \cdot 4H_2O$, 0.013 g of $Ce(NO_3)_3 \cdot 6H_2O$, 0.408 g of $H_3BO_3$ and 1.351 g of formamide were used as the starting materials, to prepare the stimulable phosphor of the invention represented by the titled formula in the form of powder.

There was produced no precipitate in the aqueous solution. The aqueous solution was then subjected to the hydrothermal treatment, and the obtained powder was analyzed by means of an X-ray diffractometer. It was confirmed that the product was crystalline $Lu_{0.995}BO_3$:0.005Ce compound of vaterite type in a single phase. After the product was fired, the stimulated emission properties of the obtained powder was measured. The same graph as FIG. 2 was obtained.

EXAMPLE 4

$Lu_{0.995}BO_3$:0.005Ce Stimulable Phosphor

The procedure of Example 1 was repeated except that 2.585 g of $Lu(NO_3)_3 \cdot 4H_2O$, 0.013 g of $Ce(NO_3)_3 \cdot 6H_2O$, 0.408 g of $H_3BO_3$ and 1.772 g of acetamide were used as the starting materials, to prepare the stimulable phosphor of the invention represented by the titled formula in the form of powder.

There was produced no precipitate in the aqueous solution. The aqueous solution was then subjected to the hydrothermal treatment, and the obtained powder was analyzed by means of an X-ray diffractometer. It was confirmed that the product was crystalline $Lu_{0.995}BO_3$:0.005Ce compound of vaterite type in a single phase. After the product was fired, the stimulated emission properties of the obtained powder was measured. The same graph as FIG. 2 was obtained.

EXAMPLE 5

Stimulable $Lu_{0.995}Bo_3$:0.005Ce Phosphor

The procedure of Example 1 was repeated except that 2.325 g of $LuCl_3 \cdot 6H_2O$, 0.011 g of $CeCl_3 \cdot 7H_2O$, 0.408 g of $H_3BO_3$ and 1.772 g of acetamide were used as the starting materials, to prepare the stimulable phosphor of the invention represented by the titled formula in the form of powder.

There was produced no precipitate in the aqueous solution. The aqueous solution was then subjected to the hydrothermal treatment, and the obtained powder was analyzed by Means of an X-ray diffractometer. It was confirmed that the product was crystalline $Lu_{0.995}BO_3$:0.005Ce compound of vaterite type in a single phase. After the product was fired, the stimulated emission properties of the obtained powder was measured. The same graph as FIG. 2 was obtained.

EXAMPLE 6

Radiation Image Storage Panel (1) Preparation of Phosphor Sheet

| | |
|---|---|
| Stimulable phosphor: $Lu_{0.99875}BO_3$: 0.001Ce, 0.00025Sm powder (prepared in Example 1) | 100 g |
| Binder: Polyurethane elastomer [Pandex T-5265H (solid), from Dainippon Ink & Chemicals, Inc.] dissolved in methyl ethyl ketone [solid content: 15 wt. %] | 23.7 g |
| Anti-yellowing agent: Epoxy resin [Epikote #1004 (solid), Yuka Shell Epoxy Kabushiki Kaisha] | 1.0 g |
| Crosslinking agent: Polyisocyanate resin [Colonate HX (solid content: 100%), Nippon Polyurethane Co., Ltd.] dissolved in methyl ethyl ketone [solid content: 71 wt. %] | 0.7 g |

The above-mentioned materials were added to 13 g of methyl ethyl ketone (MEK), and mixed and dispersed by means of a propeller mixer to prepare a coating solution. The prepared coating solution was pumped to send at a constant flow (160 ml/minute) and to spread on a temporary support (polyethylene terephthalate sheet having a surface beforehand coated with a silicon releasing agent) of 188 μm thickness. The temporary support was then transferred into an oven, dried at 80° C. for 8 minutes, and then cooled. Thus, a phosphor sheet comprising the temporary support and a phosphor layer (thickness: 330 μm) provided thereon was prepared.

(2) Preparation of Support

A light-shielding layer of approx. 20 μm thickness [composition: carbon black, calcium carbonate, silica and binder (nitrocellulose and polyester resin) in the weight ratio of 10/21/16/53] was formed by coating procedure on one surface of a polyethylene terephthalate (PST) sheet [support, thickness: 350 μm, Melinex #992, from Du pont] containing barium sulfate (10 wt. %). The other surface was coated with a soft acrylic resin (Cryscoat P-1018GS [20% toluene solution], available from Dainippon Ink & Chemicals, Inc.) to form an undercoating layer (thickness: 20 μm).

(3) Mounting of Phosphor Layer

The phosphor layer was peeled from the temporary support of the phosphor sheet, laid on the undercoating layer of the support, and continuously hot-pressed by means of a calender roll (pressure: 500 kgw/cm$^2$, temperature of the upper roll: 75° C., temperature of the lower roll: 75° C., transferring rate: 1.0 m/minute), so that the phosphor layer (thickness: 230 μm) was completely fixed onto the support via the undercoating layer.

(4) Formation of Protective Layer

On a PET film (protective film, thickness: 9 μm, Lumilar 9-P53 Toray Industries, Inc.) was coated an unsaturated polyester resin solution (Byron 30SS, Toyobo Co., Ltd.) and dried to form an adhesive layer (applied amount: 2.0 g/m$^2$). Thus treated PET film was fixed onto the phosphor layer via the adhesive layer by means of laminating rolls, to give a protective layer.

Thus, the radiation image storage panel of the invention shown in FIG. 5 was produced.

It was confirmed that the obtained storage panel after exposed to X-rays gave off stimulated emission when exposed to a semi-conductor laser beam of 633 nm.

EXAMPLE 7

Radiation Image Storage Panels

The procedure of Example 6 was repeated except that each powdery phosphor prepared in Examples 2 to 5 was used, to produce various radiation image storage panels of the invention.

It was confirmed that all of the produced storage panel after exposed to X-rays gave off stimulated emission when exposed to a semi-conductor laser beam of 633 nm.

What is claimed is:

1. A radiation image storage panel having a phosphor layer which comprises a stimulable cerium activated lutetium borate phosphor represented by the following formula (I):

$$(Lu_x, Ln_y)BO_3 : aCe, bA \quad (I)$$

in which Ln is at least one rare earth element selected from the group consisting of Y, La and Gd; A is at least one element selected from the group consisting of Pr, Nd, Pm, Sm, Eu, Tb, Dy, Ho, Er, Tm, Yb and Zr; and x, y, a and b are numbers satisfying the conditions of $0.5 \leq x < 1$, $0 \leq y < 0.5$, $0 < a \leq 0.2$, $0 \leq b \leq 0.2$ and $x+y+a+b=1.0$.

2. The radiation image storage panel of claim 1, in which A of the formula (I) is Sm or Zr.

3. The radiation image storage panel of claim 1, in which b of the formula (I) is 0.

4. The radiation image storage panel of claim 1, in which y of the formula (I) is 0.

5. The radiation image storage panel of claim 1, which comprises a support, the phosphor layer and a protective layer in order.

6. A method for producing a stimulated emission which comprises the steps of:

applying a radiation to a stimulable cerium activated lutetium borate phosphor of the following formula (I):

$$(Lu_x, Ln_y)BO_3 : aCe, bA \quad (I)$$

in which Ln is at least one rare earth element selected from the group consisting of Y, La and Gd; A is at least one element selected from the group consisting of Pr, Nd, Pm, Sm, Eu, Tb, Dy, Ho, Er, Tm, Yb and Zr; and x, y, a and b are numbers satisfying the conditions of $0.5 \leq x < 1$, $0 \leq y < 0.5$, $0 < a \leq 0.2$, $0 \leq b \leq 0.2$ and $x+y+a+b=1.0$, whereby storing an energy of the radiation in the phosphor and stimulating the phosphor in which the energy of the radiation is stored with a stimulating light, whereby giving a stimulated emission off.

7. The method of claim 6, in which A of the formula (I) is Sm or Zr.

8. The method of claim 6, in which b of the formula (I) is 0.

9. The method of claim 6, in which y of the formula (I) is 0.

10. A radiation image recording and reproducing method comprising the steps of:

exposing the radiation image storage panel of claim 1 to a radiation having passed through an object or having radiated from an object, whereby a spatial energy distribution of the radiation is recorded as a latent image in the phosphor layer of the storage panel;

irradiating the storage panel with a stimulating light to emit a stimulated light from the latent image in the phosphor layer;

photoelectrically detecting and converting the stimulated light to image signals; and forming a radiation image from the image signals.

* * * * *